United States Patent Office 3,478,692
Patented Nov. 18, 1969

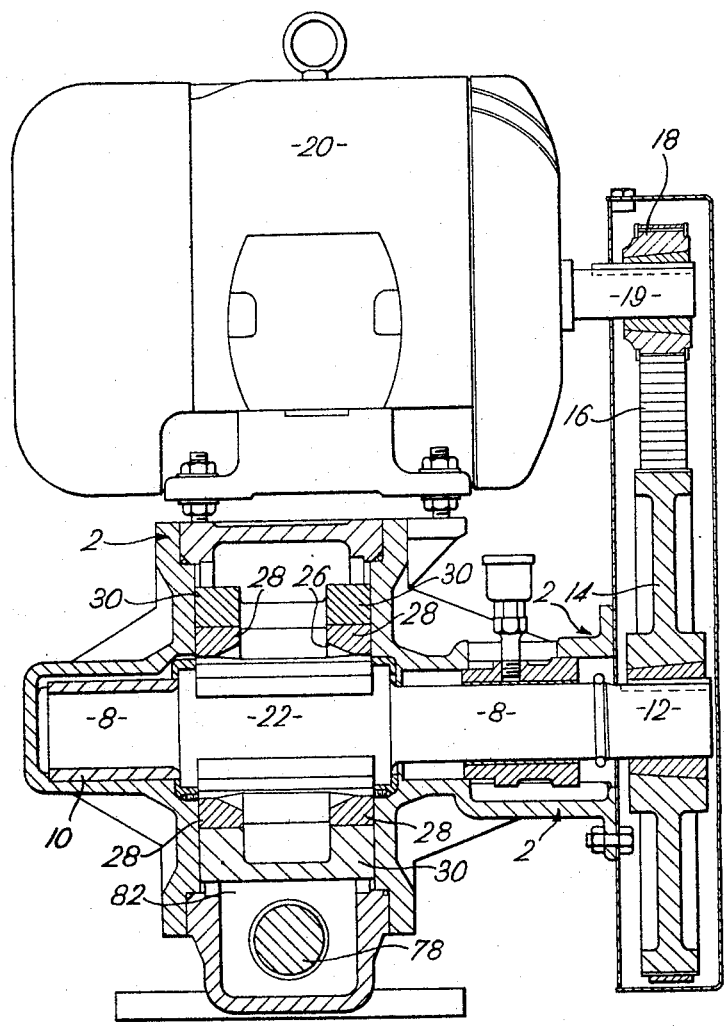

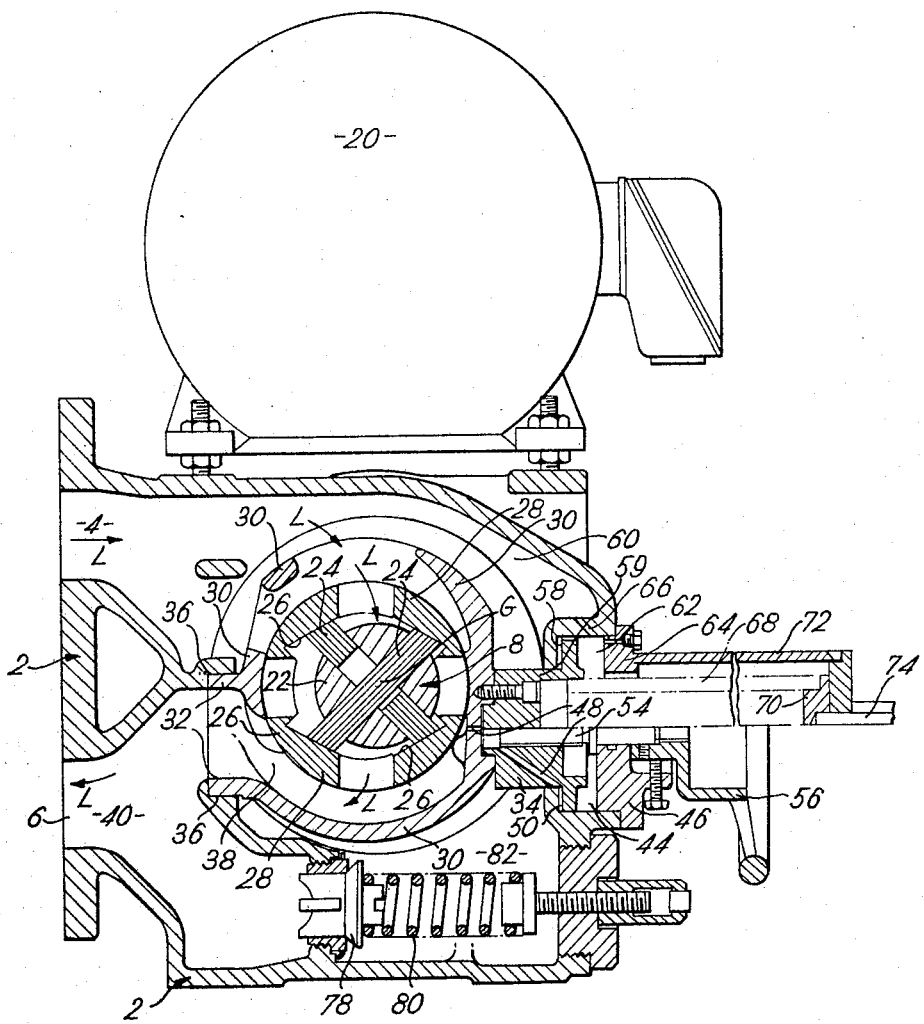

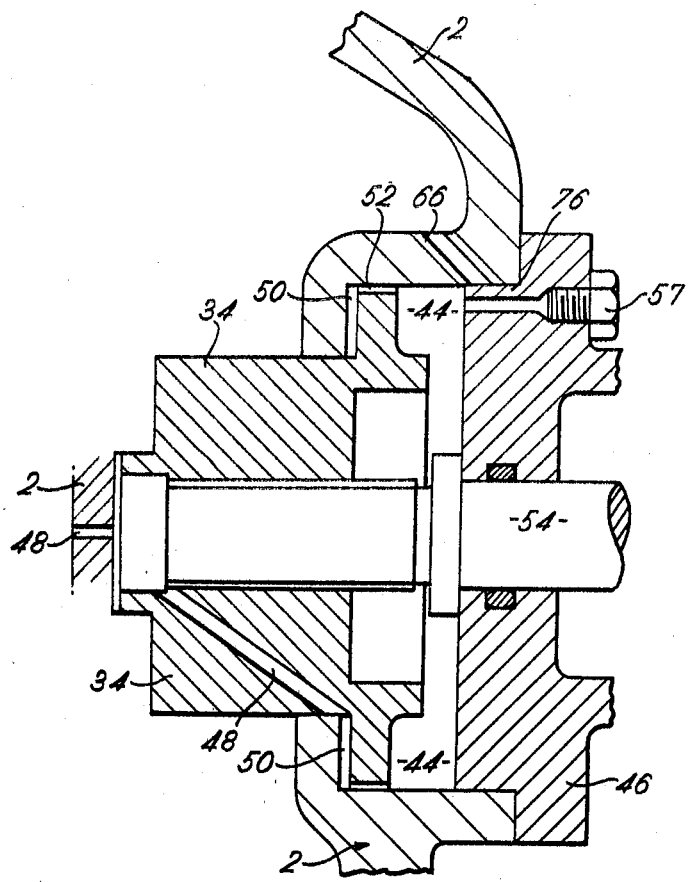

3,478,692
PUMPS
Stamford R. F. Vanderstegen-Drake, Newbury, England, assignor to Plenty & Son Limited, Newbury, England, a British company
Filed May 24, 1967, Ser. No. 640,865
Claims priority, application Great Britain, May 27, 1966, 23,983/66
Int. Cl. F04c *1/00, 3/00*
U.S. Cl. 103—120
2 Claims

ABSTRACT OF THE DISCLOSURE

The variable capacity rotary pump includes a casing having an inlet and an outlet port, and has a sliding block provided with a cylindrical recess in which a rotor is rotatably supported. The rotor has a number of inwardly facing bearing surfaces which are engaged by the ends of vanes slidably mounted in slots formed in a rotor shaft passing through the rotor and supported in bearings fixed to the casing. The sliding block has two oppositely-disposed cylindrical projections, namely, a first and a second projection, which engage within two corresponding cylindrical seatings in the pump casing and which allow sliding movement of the block in a direction at right angles to the axis of the rotor shaft to vary the capacity of the pump. The first projection is formed with a passage leading from the rotor to the outlet port. The second projection comprises a piston whose position can be set relative to the casing. The piston is provided with a flange, the side of the flange facing towards the sliding block being open to the liquid passage at the delivery portion, and the side of the flange remote from the sliding block being open to the liquid passage at the inlet portion.

DESCRIPTION OF INVENTION

This invention relates to variable-capacity rotary pumps.

It is especially concerned with variable capacity pumps of the slidable vane type such as are described in a number of our prior patent specifications, for example U.S. Patents No. 2,845,867 issued Aug. 5, 1958, and No. 2,961,969 issued Nov. 29, 1966.

These pumps each comprise a casing having a sliding block provided with a cylindrical recess in which a rotor is rotatably supported. The rotor has a number of inwardly-facing bearing surfaces which are engaged by the ends of vanes slidably mounted in slots formed in a rotor shaft passing through the rotor and carried in bearing fixed to the casing. Movement of the sliding block in the casing causes the rotor and rotor shaft to be moved relatively to each other thus varying the capacity of the pump.

Hitherto pumps of this type have had their sliding blocks arranged vertically in slideways or bores in the casing and this has required accurate and difficult machining of the block and/or casing to prevent leakage.

A pump of the type described in accordance with this invention has its sliding block arranged for horizontal movement in the pump casing in a direction at right angles to the axis of the rotor shaft. This eliminates the internal flat faces which had to be machined on the sliding member in the pump described in our specification No. 2,961,969 and on both the casing and the sliding member in the pump described in our specification No. 2,845,867.

The horizontal position of the sliding block and hence the capacity of the pump may be controlled by a plunger or the like projecting horizontally from the block and acted upon either by a manually operable member e.g. a screw engaging in the casing and connected to the plunger or a spring acting between the casing and the plunger. In the latter case this arrangement constitutes a constant pressure control for the pump.

An embodiment of a pump in accordance with this invention will now be described by way of example with reference to the accompanying drawing in which:

FIGURE 1 is a vertical cross section through the pump;
FIGURE 2 is a corresponding cross section taken at right angles to FIGURE 1, the right hand portion showing in half section two alternative devices for the control of the pump capacity; and
FIGURE 3 is a detail section of the control device illustrated in the lower right hand portion of FIGURE 2.

The pump comprises a casing 2 formed with two horizontally disposed ports 4, 6 one 4 being an inlet port and the other 6 an outlet port. A rotor shaft 8 which extends across the internal space within the casing between the ports is rotatably mounted in bearings 10 fixed to the casing. One end 12 of the shaft extends out from the main casing 2 and carries a pulley 14 driven through a toothed belt 16 from a pulley 18 carried by the output shaft 19 of a motor 20 mounted on top of the pump casing.

The central portion 22 of the rotor shaft is provided with diametrically extending slots carrying vanes 24, the ends of which bear against flat surfaces 26 on the internal surface of a tubular rotor 28. The rotor is disposed for rotation within a block 30 which is mounted for horizontal sliding movement within the casing on a cylindrical projection 32 and on a separate guide piston 34 (or 59).

The capacity of the pump depends upon the extent of eccentricity between the rotor shaft 8 and the rotor 28 and it will be appreciated that the capacity can be varied by movement of the sliding block 30 and hence the rotor relatively to the casing and the rotor shaft.

The cylindrical projection 32 on the sliding block tightly engages a seating 36 on the casing to provide a fluid tight seal so that fluid flowing under pressure from a passage 38 in the slide block to a passage 40 in the casing 2 adjacent the outlet 6 does not leak back to the suction side of the pump.

In use the liquid path will be in the direction shown by the arrows L. As fluid is pumped through the cyindrical projection 32 of the slide block the reaction force tends to push the slide block to the right as seen in the drawing. This force has to be resisted and the position of the slide block at any time is controlled either manually as illustrated in the lower half-section at the right hand side of FIGURE 2 and in FIGURE 3 by an external power actuator (not shown) or by means of a spring as illustrated in the uper half-section at the right hand side of FIGURE 2 to give approximately constant pressure at all settings.

In the first alternative delivery pressure in passage 38 is connected to a cavity 44, which is present between the inner face of the piston 34 and a block 46 secured to the casing 2, through drillings 48 through the pistons 34 and casing 2, a cavity 50 between the casing and a flange on the piston 34, and a small groove 52 (see FIGURE 3) at the highest point on the piston. Piston 34 acts as a dashpot which resists transient forces provided on the sliding block 36 during rotation so as to allow the sliding block 30 to move freely and without vibration. When manual control is to be exercised a piston rod 54 which is secured to the piston 34 and to a hand wheel 56 is rotated by the hand wheel to alter the position of the slide block and hence to vary the capacity of the pump. The cavity 44 may be relieved of air by opening a screw plug 57 on start up.

In the case where the control of the piston is exercised by means of a spring (see the upper half of the right hand portion of FIGURE 2) delivery pressure in passage 38 is connected to a cavity 58 present between the casing 2 and a flange on the piston 59 by a passage (not shown)

but similar to passage 48. Suction pressure from an inlet passage 60, formed within the casing around the sliding block and connecting with the inlet 4, is connected to a cavity 62 present between the inner face of the piston 59 and a block 64 secured to the casing, by means of a drilling 66.

The resultant force acting on the piston 59 to the right as seen in the drawing is counteracted by a spring 68 which acts between the inner side of the piston 59 and a block 70 located at the outer end of a tube 72 projecting out from and secured to the casing.

The position of the block 70 may be adjusted by a screw 74. With this arrangement the sliding block 30 moves sideways so as to take up a position where the pressure generated by the pump is equal to the load of the spring 70. In this way the output of the pump can be controlled automatically to give the exact flow requirements of the delivery system at approximately constant pressure.

If the drilling 66 through the casing wall is present in the embodiment involving the use of a hand wheel, then this is blanked off by a deep flange 76 on the block 46 (see FIGURE 3).

A safety by-pass valve 78 is conveniently fitted in the passage 40 which when opened against the bias of a spring 80 by excess pressure at the outlet port provides access between the outlet port and a passage 82 around the sliding block communicating with the passage 60 and hence with the inlet passage so that fluid is re-circulated to the suction side of the pump.

As the pump casing and sliding block do not have the internal flat faces required in designs proposed hitherto, a considerable reduction in production costs can be obtained.

I claim:

1. A variable capacity rotary pump comprising a casing formed with an inlet and an outlet port and having a sliding block provided with a cylindrical recess in which a rotor is rotatably supported, the rotor having a number of inwardly facing bearing surfaces which are engaged by the ends of vanes slidably mounted in slots formed in a rotor shaft passing through the rotor and supported in bearings fixed to the casing, the sliding block having two oppositely-disposed cylindrical projections, namely, a first and a second projection, which engage within two corresponding cylindrical seatings in the pump casing and which allow sliding movement of the block in a direction at right angles to the axis of the said shaft to vary the capacity of the pump, the first projection being formed with a passage leading from the rotor to the outlet port, the second projection comprising a piston whose position can be set relative to the casing, the piston being provided with a flange, the side of the flange facing towards the sliding block being open to the liquid passage at the delivery portion, and the side of the flange remote from the sliding block being open to the liquid passage at the inlet portion.

2. A variable capacity rotary pump comprising a casing formed with an inlet and an outlet port and having a sliding block provided with a cylindrical recess in which a rotor is rotatably supported, the rotor having a number of inwardly facing bearing surfaces which are engaged by the ends of vanes slidably mounted in slots formed in a rotor shaft passing through the rotor and supported in bearings fixed to the casing, the sliding block having two oppositely-disposed cylindrical projections, namely, a first and a second projection, which engage within two corresponding cylindrical seatings in the pump casing and which allow sliding movement of the block in a direction at right angles to the axis of the said shaft to vary the capacity of the pump, the first projection being formed with a passage leading from the rotor to the outlet port, the second projection comprising a piston whose position can be set relative to the casing, the piston being acted upon by a screw engaging the casing, and the piston being formed with a flange both sides of which are open to a passage communicating with the outlet port.

References Cited

UNITED STATES PATENTS

| 2,782,724 | 2/1957 | Humphreys. |
| 3,008,423 | 11/1961 | Miller. |
| 3,143,079 | 8/1964 | Carner. |
| 1,370,810 | 3/1921 | Hansen. |
| 2,799,995 | 7/1957 | Herman. |
| 2,895,423 | 7/1959 | Shoosmith. |
| 3,015,212 | 1/1962 | Krafft et al. |
| 3,137,235 | 5/1964 | Brown. |
| 3,204,563 | 9/1965 | Eickemeyer. |
| 3,272,139 | 9/1966 | Rosaen. |

FOREIGN PATENTS

| 575,989 | 4/1958 | Italy. |
| 528,950 | 11/1940 | Great Britain. |
| 781,950 | 8/1957 | Great Britain. |

DOWLEY J. STOCKING, Primary Examiner

W. J. GOODLIN, Assistant Examiner

U.S. Cl. X.R.

103—138